United States Patent [19]

Looney

[11] Patent Number: 4,531,542
[45] Date of Patent: Jul. 30, 1985

[54] FLUID DAMPENED BACK PRESSURE REGULATOR

[75] Inventor: Raymond H. Looney, Tulsa, Okla.

[73] Assignee: Baird Manufacturing Company, Tulsa, Okla.

[21] Appl. No.: 525,400

[22] Filed: Aug. 22, 1983

[51] Int. Cl.³ .................... F16K 47/00; F16K 15/06
[52] U.S. Cl. ................... 137/514.7; 137/539.5
[58] Field of Search ............. 137/539, 539.5, 514, 137/514.5, 514.7; 188/312, 321.11

[56] References Cited

U.S. PATENT DOCUMENTS

| | | | |
|---|---|---|---|
| 2,142,410 | 1/1939 | Quick | 137/514.7 |
| 2,361,881 | 10/1944 | Sheppard | 137/514.7 |
| 2,568,026 | 9/1951 | Pigott | 137/514.7 |
| 2,686,534 | 8/1954 | Montelius | 137/514 |
| 3,487,852 | 1/1970 | Kikendall | 137/514.5 |
| 3,610,276 | 10/1971 | Seelman et al. | 137/514.5 |
| 3,747,635 | 7/1973 | Garamy | 137/539.5 |
| 3,848,632 | 11/1974 | Powell | 137/514 |
| 4,321,945 | 3/1982 | Chabat-Courrede | 137/514.7 |

FOREIGN PATENT DOCUMENTS

| | | | |
|---|---|---|---|
| 54857 | 3/1968 | Poland | 137/539.5 |
| 272745 | 8/1970 | U.S.S.R. | 137/539.5 |

Primary Examiner—Alan Cohan
Assistant Examiner—John A. Rivell
Attorney, Agent, or Firm—Head, Johnson & Stevenson

[57] ABSTRACT

A fluid dampened back pressure regulator valve comprising a housing having an inlet port in communication with a fluid pressure source and an outlet port in communication with the inlet port, a valve seat disposed within the housing for cooperation with a valve closure member to provide alternate open and closed positions for the valve, an adjustable control spring operable for maintaining the closure member in a normally closed position and compressible upon the presence of excessive pressure at the inlet port for releasing the closure member for opening of the valve, and a fluid dampened piston assembly interposed between the spring and the closure member for dampening the opening and closing action for reducing damage to the internal elements of the valve and for eliminating valve clatter during opening and closing of the valve.

3 Claims, 3 Drawing Figures

FLUID DAMPENED BACK PRESSURE REGULATOR

BACKGROUND OF THE INVENTION

1. Field of the Invention

This invention relates to improvements in valves and more particularly, but not by way of limitation, to a fluid dampened back pressure regulator valve.

2. Description of the Prior Art

It is frequently desirable to control the fluid pressure in a vessel, or the like, in order to reduce or eliminate inadvertent hazards or damages from excessively great or exceedingly low fluid pressure conditions within the vessel. Many regulator valves are available today for relieving fluid pressure when necessary, such as those shown in U.S. Pat. Nos. 2,676,782; 3,552,432; and 3,589,397. These valve structures include an adjustable spring force applied against a valve member, such as a ball, whereby the valve is retained in a normally closed or open position, in accordance with the requirements of the particular installation wherein the valve is utilized. When the fluid pressure acting against the valve member exceeds the limitations established by the spring force or pressure, the valve may be actuated for relief of the fluid pressure within the vessel. One problem in valves of this type is the guiding of the movement of the valve closure means during the opening and closing of the valve. Any misalignment of the valve closure means with respect to the valve seat subsequent to many opening and closing actions thereof may result in unwanted fluid leakage through the valve. Another disadvantage of valves of this type is the clatter or loud noise emitting from the valve during the actuation thereof. Not only does the extreme force of opening and closing of the valve create the clatter, but also the force may damage the valve seat, valve closure member, or other working elements of the back pressure valve.

The back pressure regulator valve shown in my copending application entitled "BACK PRESSURE REGULATOR" discloses a cage means which functions as both a spring guide and guide for the reciprocation of the valve closure member, thus overcoming the problem of misalignment between the valve seat and closure member during the opening and closing of the valve, but the clatter problem and relating disadvantages have not been overcome with the design of the back pressure regulator shown in my aforementioned copending application.

SUMMARY OF THE INVENTION

The present invention contemplates a novel fluid dampened back pressure regulator which has been particularly designed and constructed for overcoming the disadvantages resulting from the clatter and related problems in valves of this type. The novel back pressure valve comprises a housing having an inlet port in communication with the interior of the vessel being monitored by the valve, and an outlet port in communication with the inlet port for discharging pressure fluid from the interior of the housing. A valve seat is interposed between the inlet and outlet ports and cooperates with a valve closure member disposed within the housing for providing alternate open and closed positions for the back pressure valve. A fluid dampened plunger or piston means is reciprocally disposed within the housing for engagement with the valve closure means and an adjustable spring means is in engagement with the piston for retaining the piston in engagement with the valve closure means in order to provide a normally closed position for the back pressure regulator. The force of the spring acting against the piston means may be adjusted as required by the operating conditions of the back pressure valve, and when the pressure present at the inlet port exceeds the force of the spring, the valve closure means is moved away from the valve seat to provide communication with the outlet port and discharge the fluid pressure therethrough. A cage means is disposed within the housing and encases the piston means and valve closure means for guiding the reciprocal movement of both during opening and/or closing of the valve, thus assuring an efficient seating of the closure means at each closing of the valve. In addition, a nipple means or sleeve means is secured around the outer periphery of the spring means for guiding the movement of the spring during contracting and/or expanding thereof. A fluid pressure chamber is provided in the cage means in association with the piston means for receiving a quantity of dampening fluid therein, such as an oil. The piston means is provided with passageways in communication with the oil reservoir provided in the fluid chamber to soften or dampen the movement of the piston in both the opening and closing of the valve closure means. As a result of the dampened action of the piston means, the back pressure valve is quiet during both the opening and closing thereof, thus eliminating the disadvantages of both the noise and force against the operating element of the valve during operation thereof. The novel back pressure valve is simple and efficient in operation and economical and durable in construction.

DETAILED DESCRIPTION OF THE PREFERRED EMBODIMENT

Figure 1:
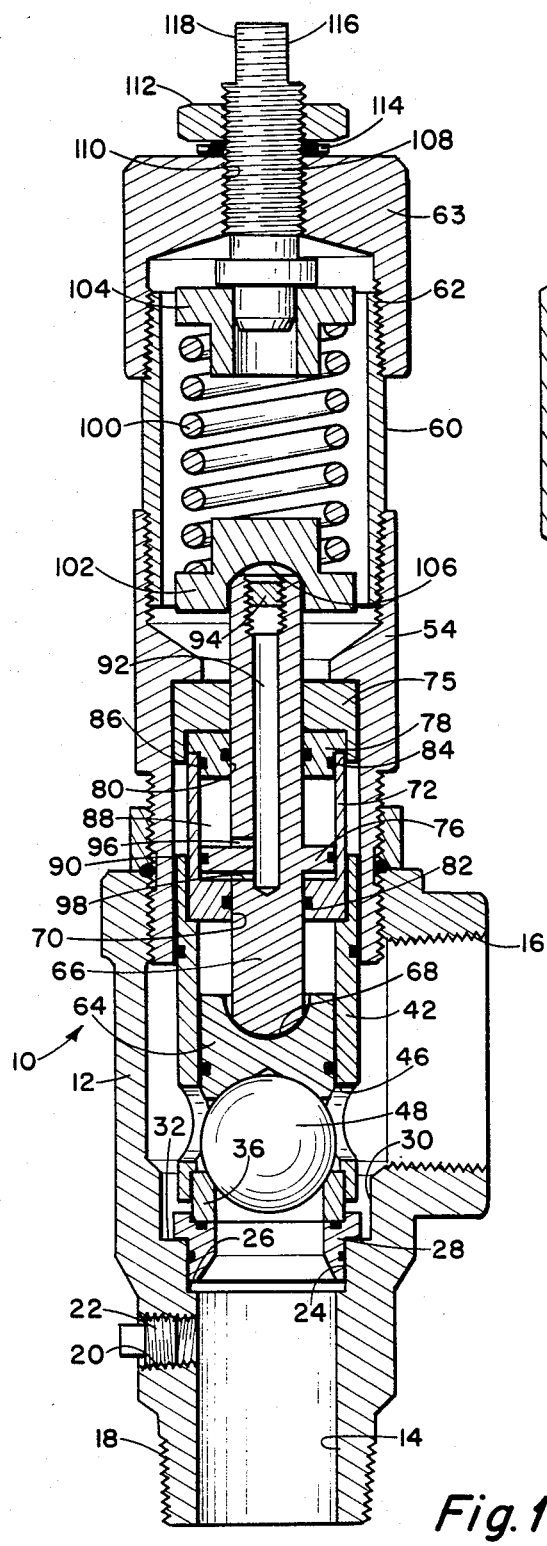
FIG. 1 is a sectional elevational view of an oil dampened back pressure regulator valve embodying the invention, and showing the valve in a closed position.
Figure 3:
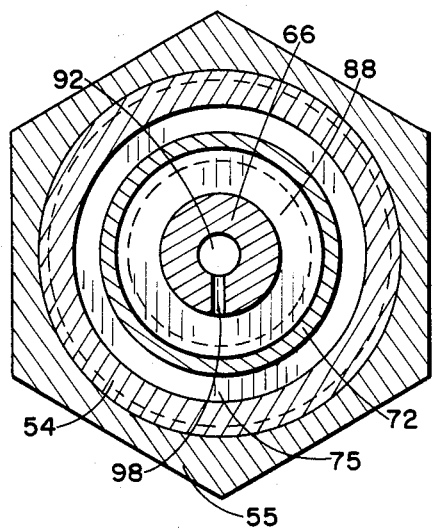
FIG. 3 is a view taken on line 2—2 of FIG. 2.
Figure 2:
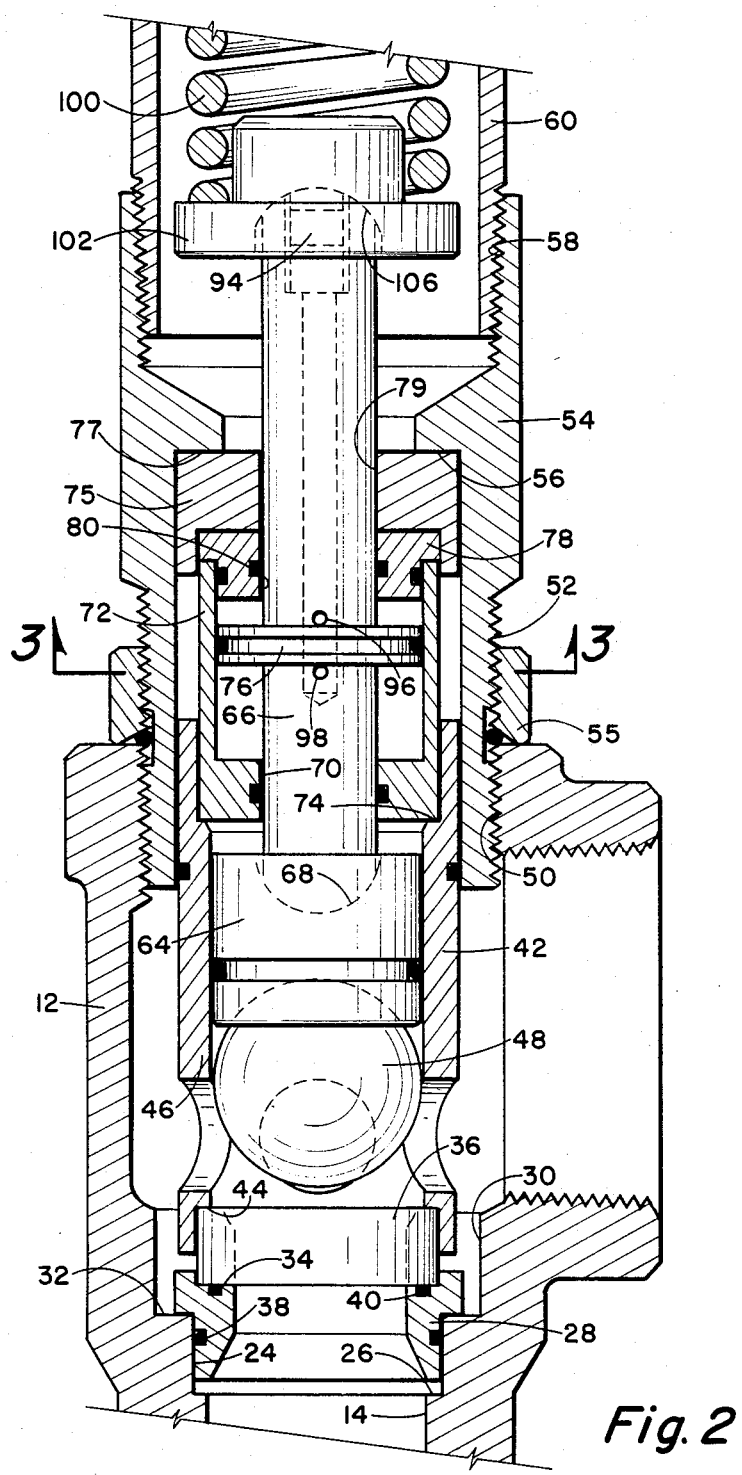
FIG. 2 is an enlarged sectional elevational view, partly in elevation, of a portion of the valve shown in FIG. 1, and illustrates an open position for the valve.

Referring to the drawings in detail, reference character 10 generally indicates a back pressure regulator valve comprising a housing 12 having an inlet port 14 provided at one end thereof and an outlet port 16 provided in the sidewall thereof in communication with the inlet port 14. The outer periphery of the housing 12 is preferably threaded at the inlet port as shown at 18 whereby the valve 10 may be threadedly secured to a suitable port in a vessel or the like (not shown) to be monitored by the back pressure valve 10. In addition, it is desirable to provide a suitable bleed port 20 in the sidewall of the housing 12 in communication with the inlet port 14, and a suitable plug means 22 may be threadedly disposed or secured to the bleed port 20 as is well known.

The port 14 is enlarged at 24 to provide an annular shoulder 26 on the inner periphery of the housing 12 for receiving the outer end of a valve seat retainer sleeve means therein, and the inner periphery of the housing 12 is further enlarged at 30 to provide an inwardly directed annular shoulder 32 for receiving the flanged sleeve means 28 thereagainst. The sleeve means 28 is provided with a centrally disposed annular recess 34 on the inwardly directed face thereof for receiving one end of a valve seat means 36 thereagainst. Of course, it is preferable to provide suitable sealing means, such as an O-ring 38, between the outer periphery of the sleeve means 28 and the bore 24, and a similar sealing means 40 between the recess 34 and the valve seat 36 for precluding leakage of fluid therebetween, as is well known.

A sleeve or cage means 42 is disposed within the housing 12 and is provided with an inwardly directed annular shoulder 44 in the proximity of the lower end thereof as viewed in the drawings for engagement with the inwardly directed end of the valve seat means 36. A plurality of spaced ports 46 are provided in the sidewall of the cage means 42 and are preferably disposed in the proximity of and slightly inboard of the shoulder 44. A valve closure means, preferably in the form of a ball 48, but not limited thereto, is loosely disposed within the cage 42 for cooperating with the valve seat 36 to provide alternate open and closed positions for the valve 10, as will be herinafter set forth in detail.

A threaded bore 50 is provided in the housing 12 in substantially axial alignment with the inlet port 14 for receiving the threaded end 52 of a sleeve means 54. A lock nut 55 is secured around the exposed portion of the end 52. The threaded end 52 is concentrically arranged with respect to the cage means 42 and is interposed between the outer periphery of the cage 42 and the bore 50. An inwardly directed annular shoulder 56 is provided on the inner periphery of the sleeve 54 for a purpose as will be hereinafter set forth and the outer end of the sleeve 54 is provided with an internally threaded portion 58 for receiving one end of a nipple or sleeve means 60 therein. The outer end of the nipple 60 is preferably threaded, as shown at 62 for receiving a cap means 63 thereon which encloses the outer end of the nipple 60, as particularly shown in FIG. 1.

A valve closure keeper member 64 is slidably disposed within the cage 42 for engagement with the valve closure member 48. A piston rod means 66 engages the keeper 64 for retaining the keeper in engagement with the valve closure means 48. Whereas the connection between the rod 66 and keeper 64 may be as desired, as shown herein, the lowermost end of the rod 66 is preferably substantially spherical for seating within a substantially spherical recess 68 provided in the inwardly directed face of the keeper. The rod means 66 extends through a bore 70 provided in the closed end of a shock cage means 72, and the shock cage 72 is supported by or rests on an inwardly directed shoulder 74 provided on the inner periphery of the cage means 42. An outwardly extending circumferential piston member 76 is either integral with or secured to the piston rod 66 and is slidably disposed within the shock cage means 72. A shock cap 78 is suitably secured to the open outer end of the shock cage 76, and is provided with a centrally disposed bore 80 for slidably receiving the piston rod 66 therethrough. A guide 75 is interposed between the shock cap 78 and an inwardly directed shoulder 77 provided on the inner periphery of the sleeve 54 and is provided with a central bore 79 for receiving the piston rod 66 therethrough. Suitable sealing means such as O-rings 82 and 84 is interposed between the outer periphery of the piston rod 66 and the bores 70 and 80, respectively, to preclude leakage of fluid therebetween, and a similar sealing means 86 is interposed between the shock cap 78 and the inner periphery of the shock cage 72, thus providing a fluid chamber 88 within the shock cage 72. In addition, a suitable sealing means 90 is interposed between the outer periphery of the piston 76 and the inner periphery of the shock cage 72 as is well known.

A centrally disposed longitudinally extending fluid passageway 92 is provided in the piston rod 66, and the open outer end thereof may be closed by a removable plug means 94, as is well known. The passageway 92 extends into communication with a pair of radially extending bores 96 and 98 which are open to the chamber 88 on opposite sides of the piston member 76. The chamber 88 may be filled with a suitable fluid, such as an oil, whereby the movement of the piston 76 within the shock cage 72 will be controlled or dampened by the cooperation of the passageway 92 with the ports 96 and 98 as the piston moves reciprocally through the fluid contained within the chamber 88, as is well known.

A helical spring means 100 is disposed within the sleeve or nipple 60 and is concentrically arranged with respect thereto. A first spring keeper means 102 is suitably secured to one end of the spring 100 for engagement with the outer end of the piston rod 66, and asecond spring keeper means 104 is suitably secured or disposed at the opposite end of the spring 100. The keeper means 102 may be connected with the piston rod 66 in any desired manner, but as shown herein it is preferable to provide a substantially spherical centrally disposed recess 106 in the lowermost face of the keeper 102 for receiving the uppermost end of the rod 66 therein. It is also preferable that the uppermost end of the rod 66 be of a substantially spherical configuration complementary to or corresponding with the configuration of the recess 106, but not limited thereto. A suitable adjusting screw means 108 extends through a centrally disposed threaded bore 110 provided in the closed end of the cap means 63 and the innermost end of the adjusting screw means 108 is in engagement with the second spring keeper 104 for adjusting the pressure of the spring 100 against the first spring keeper means 102 in order to provide a preselected force against the piston rod 66 and valve closure member 64. In this manner the valve closure or ball member 48 is retained in a normally closed position against the valve seat 46. Of course, it is preferable to provide a lock nut 112 around the outer periphery of the exposed portion of the adjusting screw 108 for locking the screw 108 in the selected longitudinal position therefor, and a suitable seal washer 114 may be interposed between the lock nut 112 and the cap 63, as is well known. It is also preferable to provide wrench flats, or the like, on the outermost end of the screw 108, as shown at 116 and 118 in FIG. 1, in order to facilitate the rotation of the screw 108 during adjusting of the force or pressure of the spring 100 against the keeper 102 and piston rod 66.

In operation, the back pressure valve 10 may be secured to a suitable vessel or the like (not shown) containing internal pressure to be monitored. The threaded end 18 of the housing 12 may be threadedly secured to a mating bore or port normally provided in the sidewall of the vessel, or the like, whereby the inlet port 14 is open to the interior of the vessel and the fluid pressure contained therein. As long as the pressure present at the inlet 14 remains below the force of the spring 100 acting against the valve closure means 48, the valve 10 will remain in the closed position thereof shown in FIG. 1.

In the event the pressure within the vessel (not shown) exceeds the force of the spring 100, the closure member 48 will move away from the valve seat 36 and establish communication between the inlet port 14 and outlet port 16 through the ports 46 of the cage means 42. The movement of the ball or closure member 48 in a direction away from the valve seat 36 moves the valve closure keeper 64 in a direction against the force of the spring 100. The fluid contained within the chamber 88, cooperating with the ports 96 and 98 and fluid passageway 92, dampen the movement of the piston 76 within the chamber 88, thus retarding or dampening the movement of the valve closure keeper 64 and valve closure 48. The result of this dampening action is a reduction of the force of engagement between the internal elements of the valve 10 during the opening and closing thereof, thus substantially eliminating noise or valve clatter and reducing damage to the valve. Of course, the movement of the piston 76 in one direction is limited by the engagement thereof with the shock cap 78, and in the opposite direction by the engagement of the ball or closure means 48 with the valve seat 36.

When the fluid pressure has been relieved from the interior of the vessel through the housing 12 and outlet port 16, and the pressure at the inlet port 14 returns to a pressure less than the force of the spring 100, the spring 100 will move the piston rod 66 in a direction toward the valve seat 36, whereupon the valve closure 48 will be returned to the seating position against the valve seat 36. The oil or fluid within the fluid chamber 88 will dampen the movement of the piston 76 within the chamber 88, thus closing the valve quietly and with relatively little force or pounding of the internal elements of the valve against one another.

The cage means 42 functions as a guide for the reciprocal movement of not only the valve closure follower 64 but also of the ball member 48 during opening and/or closing of the valve 10. In addition, the sleeve or nipple 60 functions as a guide for the expansion and contraction of the spring 100 during opening and/or closing of the valve 10. This guiding action for the ball 48 and spring 100 assures an efficient closing of the valve even subsequent to many opening and closing actions thereof.

From the foregoing it will be apparent that the present invention provides a novel back pressure valve having oil dampened piston means for substantially eliminating valve clatter during opening and closing of the valve and greatly reducing the force of the closing and opening of the valve for increasing the efficient and useful life thereof. The oil dampened piston means is interposed between the pressure spring means and the valve closure means to provide the dampening effect of the opening and closing of the valve.

Whereas the present invention has been described in particular relation to the drawings attached hereto, it should be understood that other and further modifications, apart from those shown or suggested herein may be made within the spirit and scope of this invention.

What is claimed is:

1. A fluid dampened back pressure regulator valve comprising housing means having inlet port means and outlet port means in communication with the inlet port means, valve seat means disposed within the housing and interposed between the inlet port means and outlet port means, cage means engageable with the valve seat means for retaining the valve seat in the housing means, valve closure means loosely disposed within the cage means and cooperating with the valve seat means to provide alternate open and closed positions for the back pressure regulator valve, reciprocal piston means disposed within the cage means and engageable with the valve closure means, spring means disposed within the housing means and in engagement with the reciprocal piston means for retaining the piston means in engagement with the closure means and maintaining a normally closed position for the back pressure regulator valve, fluid reservoir means cooperating with the reciprocal piston means for dampening the opening and closing of the valve closure means with respect to the valve seat means for reducing the clattering of the back pressure valve during operation thereof, wherein the reciprocal piston means comprises shock cage means disposed within the housing means and having one closed end engageable with the cage means and one open end, a reciprocal piston rod member extending through the shock cage means and through the closed end thereof, shock cap means secured to the open end of the shock cage means to provide a fluid reservoir chamber therein, a piston member carried by the piston rod member and reciprocally disposed within the fluid chamber, and passageway means provided in the piston rod member in communication with the fluid reservoir chamber on opposite sides of the piston member for cooperating with the fluid reservoir to provide the dampening during the opening and closing of the back pressure regulator valve.

2. A fluid dampened back pressure regulator valve as set forth in claim 1 wherein the housing means comprises a first housing member having the inlet and outlet port means provided therein, said first housing member having a bore in substantial axial alignment with the inlet port means, sleeve means secured in said bore and surrounding the reciprocal piston means, an inwardly directed annular shoulder provided on the inner periphery of the sleeve means and engagable with the reciprocal piston means for retaining the reciprocal piston means within the housing means, nipple means secured to the sleeve means and encasing the spring means, and cap means secured to the outer end of the nipple means.

3. A fluid dampened back pressure regulator as set forth in claim 2 and including adjusting screw means extending through the cap means and into engagement with the spring means for adjusting the force of the spring means.

* * * * *